(12) United States Patent
Carter et al.

(10) Patent No.: US 6,315,475 B1
(45) Date of Patent: Nov. 13, 2001

(54) DRIVE BELT SYSTEM ARRANGED FOR REDUCING ARCING

(75) Inventors: Daniel L. Carter, Lexington, KY (US); Timothy M. Minerd, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/444,438

(22) Filed: Nov. 22, 1999

(51) Int. Cl.[7] ..................................... B41J 13/08

(52) U.S. Cl. ..................... 400/635; 361/212; 361/220

(58) Field of Search ................... 400/635; 271/198; 361/212, 214, 220, 221, 222, 223, 224

(56) References Cited

U.S. PATENT DOCUMENTS

| | | | |
|---|---|---|---|
| 3,693,517 | * | 9/1972 | Clark ........................................ 399/4 |
| 4,402,593 | * | 9/1983 | Bernard et al. .................. 361/212 X |
| 4,494,166 | * | 1/1985 | Billings et al. ....................... 361/214 |
| 4,553,191 | * | 11/1985 | Franks, Jr. et al. .................. 361/212 |
| 4,771,360 | * | 9/1988 | Ayash ................................... 361/221 |
| 5,172,173 | * | 12/1992 | Goto et al. ........................... 355/275 |

* cited by examiner

*Primary Examiner*—John S. Hilten
*Assistant Examiner*—Minh H. Chau
(74) *Attorney, Agent, or Firm*—Wayne J. Egan

(57) ABSTRACT

A drive belt system comprises a drive belt that is conductive. The drive belt system further comprises ground coupling means, such as a conductive brush or rubbing material, arranged for coupling the drive belt to ground. As a result, arcing in the drive belt system is reduced.

20 Claims, 3 Drawing Sheets

DRIVE BELT SYSTEM ARRANGED FOR REDUCING ARCING

FIELD OF THE DISCLOSURE

This disclosure relates generally to drive belt systems and, in particular, to a drive belt system arranged for reducing arcing.

BACKGROUND OF THE INVENTION

Drive belt systems are known. A drive belt system typically comprises a plurality of drive shafts, each drive shaft coupled to a corresponding drive pulley. A motor is arranged to power one drive shaft. This latter drive shaft is known as a motor drive shaft, and the corresponding drive pulley is known as a motor drive pulley. A drive belt couples the motor drive pulley to the remaining drive pulleys. When the motor is energized, the motor drive shaft rotates which, in turn, rotates the motor drive pulley. The motor drive pulley rotation, in turn, moves the drive belt which, in turn, causes is the remaining drive pulleys to rotate.

One known problem with drive belt systems is arcing. Arcing occurs when voltage builds up on the drive belt and on the rotating drive shafts and drive pulleys during operation. Testing has shown that 400-Volt buildups on rotating drive shafts of outer motor rotors are common. Also, testing has also shown that 2500-Volt buildups on the drive belt are common. This is due to the large surface area of the rotating outer hub. When the voltage on the drive belt or on the motor rotor reaches a sufficient level, arcing to ground will occur. This high-voltage arcing results in several problems.

The arcing ground path typically will include the drive shafts, which typically include bearings. This high-voltage arcing in the bearing—called "fluting"—results in bearing surface deterioration.

Also, this high-voltage arcing also causes electromagnetic emission ("EME"). This EME, in turn, results in unwanted noise in the drive belt system's host environment. For example, modern printing machines typically contain a plurality (perhaps 20–30) of individual drive belt systems. If each drive belt system generates EME, the cumulative noise presented to the host printing machine may be substantial.

The problem, therefore, is how to reduce arcing in drive belt systems.

In the past, arcing in drive belt systems has been reduced by grounding substantially all rotating parts in drive belt systems. This grounding typically has been done by using brushes rubbing on all rotating parts. These brushes are carbon fiber and have many strands. The brushes have been mounted to all motors or to their rotating shafts, thus potentially resulting in a large number of total brushes. The cost of each brush and its mounting has been in the $1.50 to $2.00 range. Because of the large number of brush grounds required in a large system, the reliability of the grounding and the system is reduced. Also, the large number of grounding brushes also require more space and increase the system cost significantly.

As a result, there is a need for an improved drive belt system.

SUMMARY OF THE INVENTION

In one aspect of the invention, a drive belt system comprises a plurality of drive shafts. Each drive shaft of the plurality of drive shafts is coupled to a corresponding drive pulley, the corresponding drive pulleys thus forming a plurality of drive pulleys. The drive belt system further comprises a drive belt, the drive belt being conductive and coupled to the plurality of drive pulleys. The drive belt system further comprises ground coupling means for coupling the drive belt to ground, thus reducing arcing.

In another aspect of the invention, a printing machine comprises at least one drive belt system, the at least one drive belt system comprises a plurality of drive shafts. Each drive shaft of the plurality of drive shafts is coupled to a corresponding drive pulley, the corresponding drive pulleys thus forming a plurality of drive pulleys. The at least one drive belt system further comprises a drive belt, the drive belt being conductive and coupled to the plurality of drive pulleys. The at least one drive belt system further comprises ground coupling means for coupling the drive belt to ground, thus reducing arcing.

DESCRIPTION OF THE PREFERRED EMBODIMENT

Briefly, a drive belt system comprises a drive belt that is conductive. The drive belt system further comprises ground coupling means, such as a conductive brush or rubbing material, arranged for coupling the drive belt to ground. As a result, arcing in the drive belt system is reduced.

Figure 1:
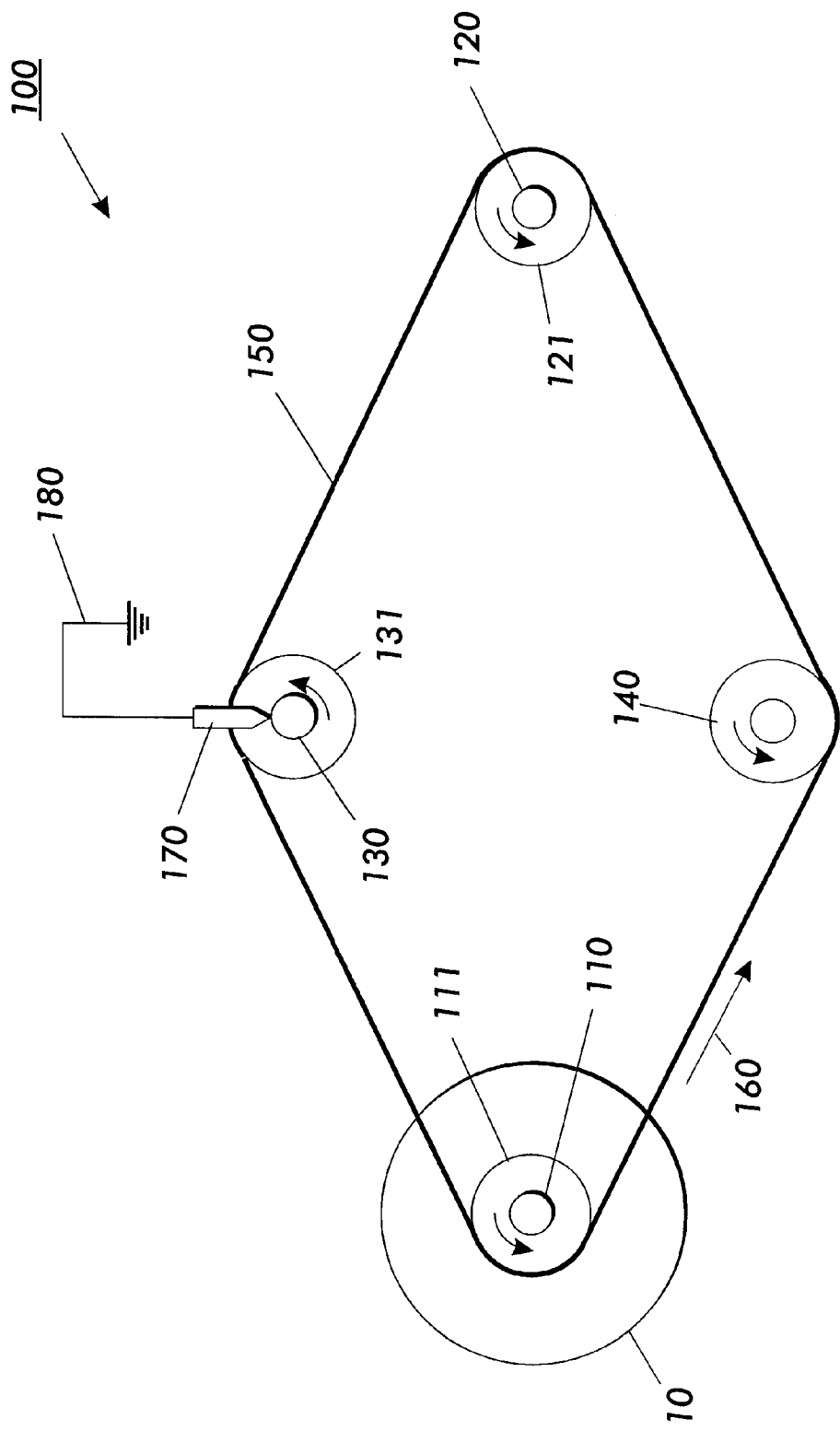
FIG. 1 shows a drive belt system arranged for reducing arcing, in accordance with the present invention.

Referring now to FIG. 1, there is shown a drive belt system 100 comprising a plurality of drive shafts 110, 120 and 130. In turn, each drive shaft 110, 120 and 130 is coupled to a corresponding drive pulley 111, 121 and 131. The drive belt system 100 further comprises a belt tensioner 140.

As shown, the drive shaft 110 is arranged to be rotatably powered by a motor 10. As a result, the drive shaft 110 is known as a motor drive shaft, and the corresponding drive pulley 111 is known as a motor drive pulley.

Still referring to FIG. 1, the drive belt system 100 further comprises a drive belt 150. The drive belt 150 is electrically conductive. Further, the drive belt 150 is coupled to the plurality of drive pulleys 111, 121 and 131, and to the belt tensioner 140.

When the motor 10 is energized, the motor drive pulley 111 rotates, thus causing the drive belt 150 to move in the direction indicated by the arrow 160. As a result of the drive belt 150 movement, belt tensioner 140, as well as drive pulleys 121 and 131, are caused to rotate in the directions indicated.

As shown, the drive belt system 100 further comprises ground coupling means 170 for coupling the drive belt 150 to ground 180. The drive shafts 110, 120 and 130, drive pulleys 111, 121 and 131, and belt tensioner 140 are electrically conductive. As a result of drive belt 150 being electrically conductive and further being coupled to ground 180 by means of the ground coupling means 170, arcing in the drive belt system 100's rotating components is thereby reduced.

In one embodiment, the ground coupling means 170 comprises a conductive brush.

In another embodiment, the ground coupling means 170 comprises a conductive rubbing material.

In a further embodiment, the ground coupling means 170 comprises a metal strip.

In one embodiment of the drive belt system 100, shown in FIG. 1, the ground coupling means 170 is arranged for contacting one drive shaft of the plurality of drive shafts 110, 120 and 130 and is further arranged for coupling to ground 180. For example, as shown, the ground coupling means 170 is arranged for contacting drive shaft 130. It will be appreciated that, in alternative embodiments (not shown in FIG. 1), the ground coupling means 170 may be arranged for contacting either drive shaft 120 or motor drive shaft 110.

Figure 2A:
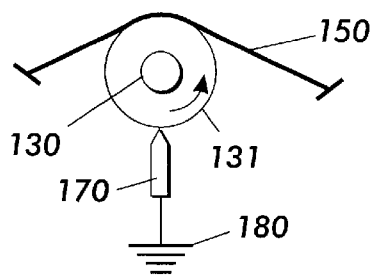
FIGS. 2A, 2B and 2C show alternate embodiments of the FIG. 1 drive belt system.

In another embodiment of the drive belt system 100, shown in FIG. 2A, the ground coupling means 170 is arranged for contacting one drive pulley of the plurality of drive pulleys 111, 121 and 131, and is further arranged for coupling to ground 180. For example, as shown, the ground coupling means 170 is arranged for contacting drive pulley 131. It will be appreciated that, in alternate embodiments (not shown in FIG. 2A), the ground coupling means 170 may be arranged for contacting either drive pulley 121 or motor drive pulley 111.

Figure 2B:
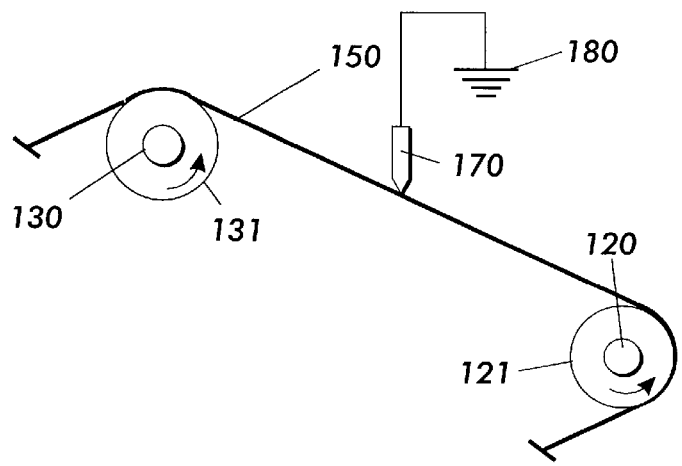

In still another embodiment of the drive belt system 100, shown in FIG. 2B, the ground coupling means 170 is arranged for contacting the drive belt 150, and is further arranged for coupling to ground 180.

Figure 2C:
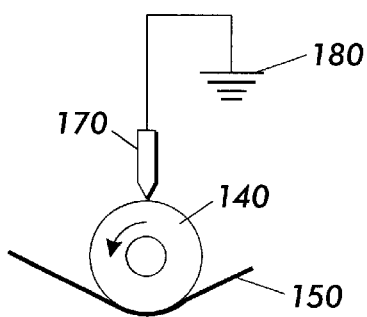

In a further embodiment of the drive belt system 100, shown in FIG. 2C, the ground coupling means 170 is arranged for contacting the belt tensioner 140, and is further arranged for coupling to ground 180.

Figure 3:
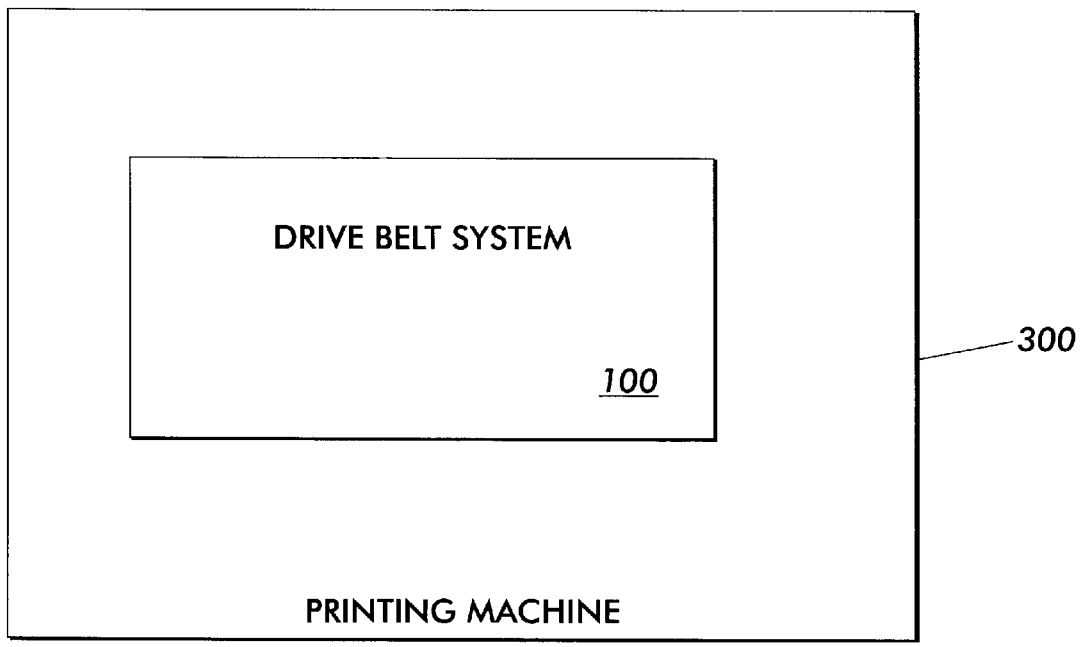
FIG. 3 shows a printing machine having the FIG. 1 drive belt system therein.

It will be appreciated that a printing machine may be arranged with at least one drive belt system 100 arranged for reducing arcing, in accordance with the present invention. Referring to FIG. 3, for example, there is shown an exemplary printing machine 300 arranged with at least one drive belt system 100, in accordance with the present invention. It will be appreciated that the at least one drive belt system 100 depicted in FIG. 3 corresponds to the drive belt system 100 depicted in FIGS. 1, 2A, 2B and 2C, and described herein.

In summary, in accordance with the present invention, a drive belt system 100 is arranged for reduced arcing by, first, arranging the drive belt 150 to be conductive and, second, arranging a ground coupling means 170 for coupling the drive belt 150 to ground 180, as herein described.

As a result of the present invention, high-voltage arcing through the drive shaft bearings on all shafts and motors connected to the drive belt 150 is substantially reduced. As a result, the drive shaft life of all shafts is enhanced, while simultaneously reducing harmful EME noise. It is estimated the incremental cost of making a nonconductive drive belt into a conductive drive belt is about $0.10, and the cost of a single ground coupling means such as, for example, a single brush ground, is about $2.00, thereby providing a very cost-effective solution for reducing arcing in the drive belt system.

Some advantages of a drive belt system arranged for reducing arcing, in accordance with the present invention, are now discussed. To begin, as a result of the present invention, the associated drive belt system now requires only a single (1) ground coupling device such as, for example, a grounding brush, in order to reducing arcing. In contrast, a prior drive belt system using prior methods typically required a plurality such as, for example, six (6) or more, of similar grounding devices. Therefore, as a result of the present invention, the total number of required grounding devices is reduced from typically six (6) or more to only one (1).

Moreover, as a result of the present invention, the reliability of the shaft bearings is improved. Also, the bearing life in motors and drive shafts is improved. Also, machine EME is lowered. Also, risk of arcing in internal electrical circuits of the motor is lowered. Also, risk of arcing of any electrical equipment that comes within close proximity of the drive belt or rotating motors is lowered. Also, the amount of ozone released by the machine is lowered, due to less arcing in the bearings. Also, equipping printers with the present invention allows the printers to be placed closer to other electrical equipment without EME problems.

While various embodiments of a drive belt system arranged for reducing arcing, in accordance with the present invention, have been described above, the scope of the invention is defined by the following claims.

We claim:

1. A drive belt system comprising a plurality of drive shafts, each drive shaft of the plurality of drive shafts coupled to a corresponding drive pulley, the corresponding drive pulleys thus forming a plurality of drive pulleys, the drive belt system further comprising a drive belt, the drive belt being coupled to the plurality of drive pulleys, the drive belt system further comprising ground coupling means for coupling the drive belt to ground, thus reducing arcing, wherein the drive belt, each drive shaft of the plurality of drive shafts and each drive pulley of the plurality of drive pulleys are electrically conductive.

2. The drive belt system of claim 1, the ground coupling means arranged for contacting only one drive shaft of the plurality of drive shafts and further arranged for coupling to ground.

3. The drive belt system of claim 1, the ground coupling means arranged for contacting only one drive pulley of the plurality of drive pulleys and further arranged for coupling to ground.

4. The drive belt system of claim 1, the ground coupling means arranged for contacting only the drive belt and further arranged for coupling to ground.

5. The drive belt system of claim 1, further comprising a belt tensioner, the drive belt being further coupled to the belt tensioner, the ground coupling means arranged for contacting the belt tensioner and further arranged for coupling to ground, wherein the belt tensioner is electrically conductive.

6. The drive belt system of claim 1, wherein one drive shaft of the plurality of drive shafts comprises a motor drive shaft arranged to be rotatably powered by a motor, the corresponding drive pulley comprising a motor drive pulley.

7. The drive belt system of claim 6, the ground coupling means arranged for contacting the motor drive shaft and further arranged for coupling to ground.

8. The drive belt system of claim 1, the ground coupling means comprising only one ground coupling device.

9. The drive belt system of claim 8, wherein the ground coupling device comprises a conductive brush.

10. The drive belt system of claim 8, wherein the ground coupling device comprises a conductive rubbing material.

11. A printing machine comprising at least one drive belt system, the at least one drive belt system comprising a plurality of drive shafts, each drive shaft of the plurality of drive shafts coupled to a corresponding drive pulley, the corresponding drive pulleys thus forming a plurality of drive pulleys, the at least one drive belt system further comprising a drive belt, the drive belt being coupled to the plurality of drive pulleys, the at least one drive belt system further comprising ground coupling means for coupling the drive belt to ground, thus reducing arcing, wherein the drive belt, each drive shaft of the plurality of draft shafts and each drive pulley of the plurality of drive pulleys are electrically conductive.

12. The printing machine of claim 11, the ground coupling means arranged for contacting only one drive shaft of the plurality of drive shafts and further arranged for coupling to ground.

13. The printing machine of claim 11, the ground coupling means arranged for contacting only one drive pulley of the plurality of drive pulleys and further arranged for coupling to ground.

14. The printing machine of claim 11, the ground coupling means arranged for contacting only the drive belt and further arranged for coupling to ground.

15. The printing machine of claim 11, further comprising a belt tensioner, the drive belt being further coupled to the belt tensioner, the ground coupling means arranged for contacting the belt tensioner and further arranged for coupling to ground, wherein the belt tensioner is electrically conductive.

16. The printing machine of claim 11, wherein one drive shaft of the plurality of drive shafts comprises a motor drive shaft arranged to be rotatably powered by a motor, the corresponding drive pulley comprising a motor drive pulley.

17. The printing machine of claim 16, the ground coupling means arranged for contacting the motor drive shaft and further arranged for coupling to ground.

18. The printing machine of claim 11, the ground coupling means comprising only one ground coupling device.

19. The printing machine of claim 18, wherein the ground coupling device comprises a conductive brush.

20. The printing machine of claim 18 wherein the ground coupling device comprises a conductive rubbing material.

* * * * *